(12) United States Patent
Aguirre et al.

(10) Patent No.: US 8,909,284 B2
(45) Date of Patent: Dec. 9, 2014

(54) SIM CARD MODULE AND INTERFACE FOR EXTERNAL INSTALLATION TO PROVIDE BROADBAND TO A CUSTOMER PREMISES

(75) Inventors: Sergio Aguirre, Southlake, TX (US); Raafat E. Kamel, Little Falls, NJ (US); Kamlesh S. Kamdar, Dublin, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 911 days.

(21) Appl. No.: 13/070,992

(22) Filed: Mar. 24, 2011

(65) Prior Publication Data

US 2012/0243159 A1 Sep. 27, 2012

(51) Int. Cl.
| | |
|---|---|
| H04M 1/00 | (2006.01) |
| H01Q 19/10 | (2006.01) |
| H01Q 25/00 | (2006.01) |
| H01Q 21/28 | (2006.01) |
| H01Q 1/12 | (2006.01) |
| H04W 12/06 | (2009.01) |
| H04L 12/28 | (2006.01) |
| H04W 4/00 | (2009.01) |

(52) U.S. Cl.
CPC .......... *H04L 12/2834* (2013.01); *H01Q 19/102* (2013.01); *H04W 4/003* (2013.01); *H01Q 25/002* (2013.01); *H01Q 21/28* (2013.01); *H01Q 1/1221* (2013.01); *H04W 12/06* (2013.01)
USPC ....... 455/550.1; 455/12.1; 455/3.01; 715/760

(58) Field of Classification Search
CPC . G06F 3/00; H04M 1/72519; H04B 7/18513; H04H 40/90
USPC ...................... 455/550.1, 3.01, 12.1; 715/760
See application file for complete search history.

(56) References Cited

U.S. PATENT DOCUMENTS

| | | | | |
|---|---|---|---|---|
| 7,493,078 | B2 * | 2/2009 | Perlman | ........................ 455/3.01 |
| 2005/0179607 | A1 | 8/2005 | Gorsuch et al. | |
| 2007/0173303 | A1 | 7/2007 | Viorel et al. | |
| 2010/0197222 | A1 * | 8/2010 | Scheucher | ................... 455/11.1 |
| 2010/0311321 | A1 | 12/2010 | Norin | |
| 2010/0313232 | A1 | 12/2010 | Norin | |
| 2012/0185785 | A1 * | 7/2012 | Avellan et al. | ................. 715/760 |

\* cited by examiner

*Primary Examiner* — Danh Le

(57) ABSTRACT

An outdoor broadband unit may be connected to an external portion of a customer premises. The outdoor broadband unit may include a radio frequency (RF) antenna to receive communications from a Long-Term Evolution (LTE) network and a printed wiring board. The printed wiring board may include an integrated circuit (IC) chip to implement a subscriber identity module (SIM) to provide services for the LTE network. The IC chip may be soldered to the printed wiring board and have a rated temperature range corresponding to an industrial grade or military grade integrated circuit. The IC chip may provide authentication services for the SIM using a hypertext transfer protocol secure (HTTPS) connection. The printed wiring board may further include a control module to implement an air interface for the LTE network. A radome may contain the RF antenna and the printed wiring board.

22 Claims, 7 Drawing Sheets

SIM CARD MODULE AND INTERFACE FOR EXTERNAL INSTALLATION TO PROVIDE BROADBAND TO A CUSTOMER PREMISES

BACKGROUND

Bundled media services (e.g., combination packages of television, telephone, and broadband Internet services) have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless services for some of these services (e.g., broadband access). However, previous generations of fixed wireless services have generally been unsuccessful. Expensive network equipment and customer premises equipment (CPE), high CPE installation costs, use of proprietary technology, and low data rates are among some of the reasons these fixed wireless services remained unpopular.

Portions of the CPE for fixed wireless networks may be installed outdoors, such as on the roof of the customer premises. Outdoor installations can subject the CPE to harsher environmental conditions than indoor installations.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a customer premises equipment (CPE) wireless architecture. Combined gateway equipment for the CPE architecture may include satellite and radio frequency (RF) antennas that are mounted (e.g., on a roof) at the customer premises. The combined gateway equipment may include an outdoor broadband unit through which a broadband connection to a wireless terrestrial network, such as a Long-Term Evolution (LTE) network, may be established. The outdoor broadband unit may include a subscriber identity module (SIM) that is permanently fixed to the outdoor broadband unit, such as via soldering of the SIM to printed circuit board. The SIM may additionally be hardened to withstand high and low temperatures that may occur in the outdoor installation.

Figure 1:
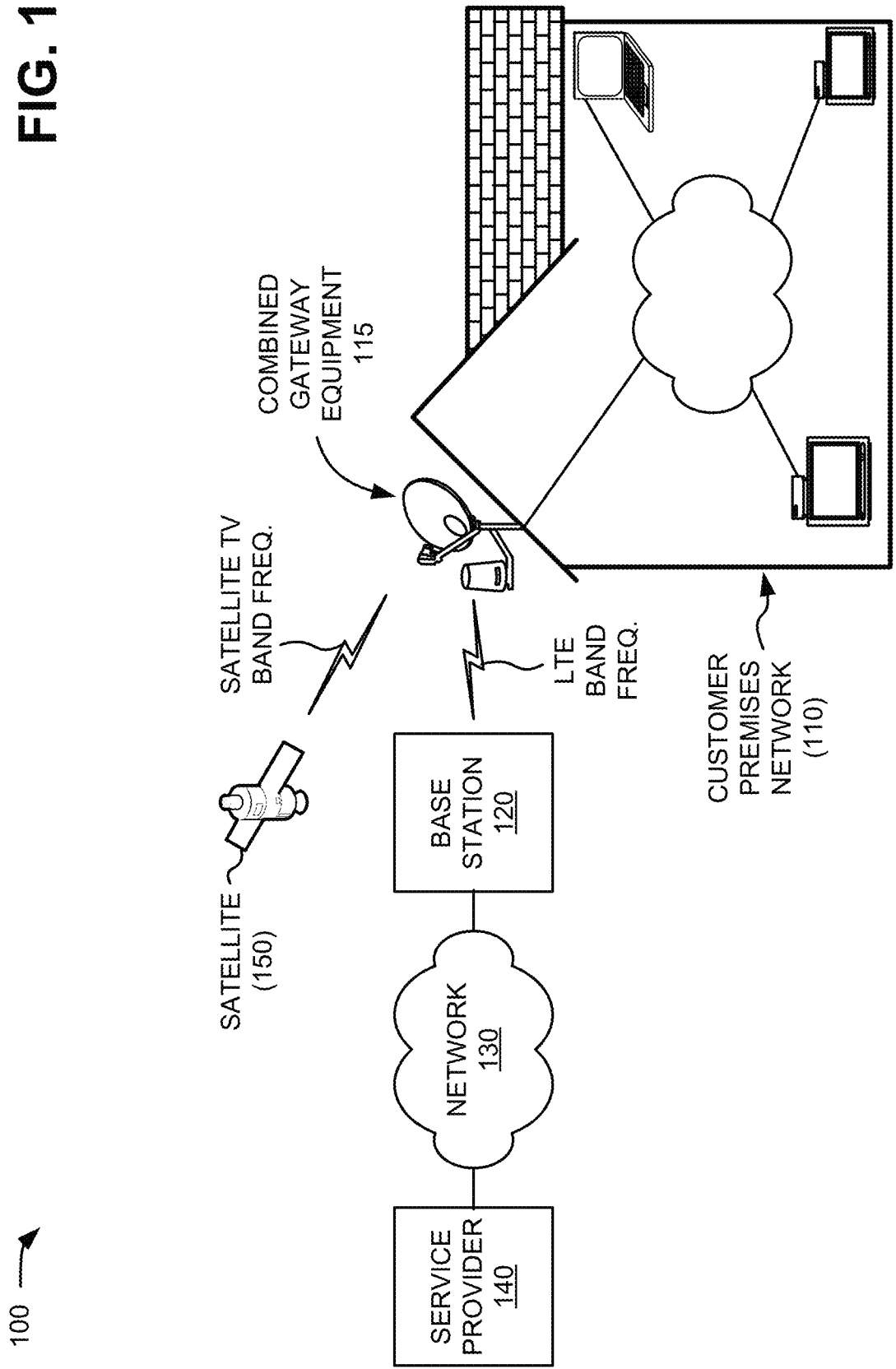
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises network 110, combined gateway equipment 115, a base station 120, a network 130, a service provider 140, and a satellite network 150. A single customer premises network 110, base station 120, network 130, service provider 140, and satellite network 150 have been illustrated in FIG. 1 for simplicity. In practice, there may be more customer premises networks 110, combined gateways 115, base stations 120, networks 130, service providers 140, and/or satellite networks 150.

Customer premises network 110 may include one or more devices connected to each other, base station 120, and/or satellite network 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards). In the example shown in FIG. 1, customer premises network 110 may connect to base station 120 through a two-way wireless connection (e.g., using a LTE band frequency) and may connect to satellite network 150 through a one-way (e.g., downlink) wireless connection (e.g., using a satellite TV band frequency). The two-way wireless connection and the one-way wireless connection may be implemented using combined gateway equipment 115.

Combined gateway equipment 115, which is described in more detail below, may generally include mechanisms for communicating with satellite network 150 (to provide satellite-based communications) and for communicating with base station 120 (to provide terrestrial RF-based communications). Combined gateway equipment 115 may connect, such as via a coaxial connection, to devices inside of the customer premises, such as the devices connected to customer premises network 110.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one implementation, base station 120 may utilize LTE standards operating in a 700 MHz frequency band.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Service provider 140 may include one or more server devices, or other types of computation or communication devices, that gather, process, search, and/or provide information in a manner described herein. In one implementation, service provider 140 may include a web server, computer system, an application, a cable head-end, and/or a broadcasting device capable of providing Internet Protocol (IP)-based content and/or services to devices in customer premises network 110.

Satellite network 150 may provide multimedia content from, for example, a direct broadcast satellite (DBS) service provider (not shown). Satellite network 150 may provide a downlink signal over a designated satellite TV band frequency, typically in the range of 950 MHz to 2150 MHz. The downlink signal may be received using a satellite antenna/receiver system at the customer premises to present satellite TV content to a user.

In implementations described herein, customer premises network 110 may combine LTE functionality with satellite TV service. Using combined gateway equipment 115, both broadband (over LTE) service (e.g., via base station 120) and satellite TV service (e.g., via satellite network 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
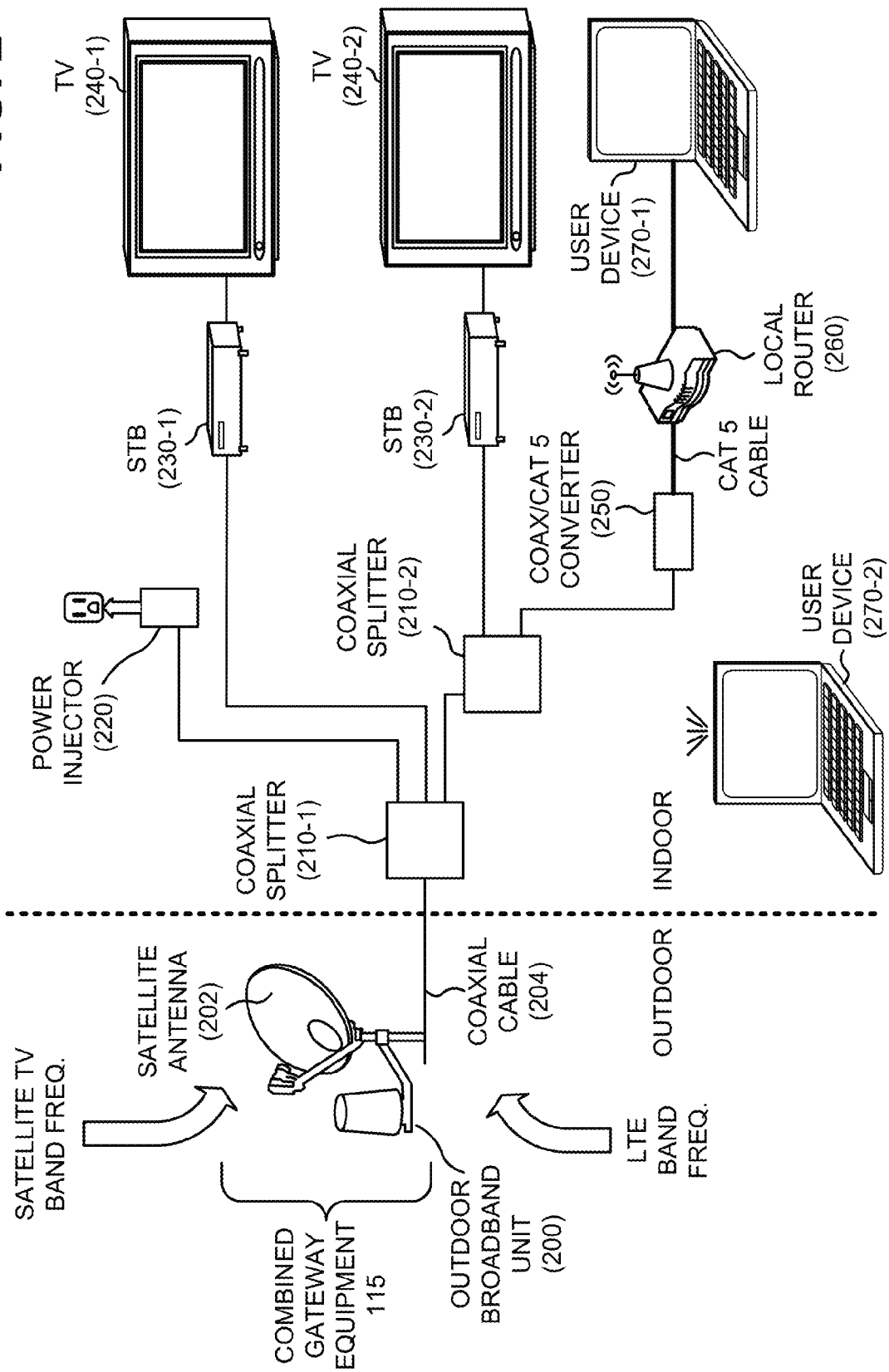
FIG. 2 is a diagram of an example customer premises network illustrated in FIG. 1 according to an implementation described herein.

FIG. 2 is a diagram of an example customer premises network 110 according to an implementation described herein. As illustrated, combined gateway equipment 115 of customer premises network 110 may include an outdoor broadband unit 200 and a satellite antenna 202. A coaxial cable 204 may connect combined gateway equipment 115 to the indoor portion of customer premises network 110. Customer premises network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing devices and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110) as part of combined gateway equipment 115. For example, outdoor broadband unit 200 may utilize a pre-existing or a new satellite TV installation in a way that both broadband (over LTE) service and satellite TV are brought indoors (e.g., inside the customer premises) over coaxial cable 204.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter. For example, coaxial splitters 210 may facilitate allocating logical channels using different frequency blocks for viewer-selected television programming and broadband signals to the SWiM-compatible STBs 230 and/or local router 260.

Power injector 220 may include a conventional mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a conventional device to convert incoming signals from coaxial cables to outgoing signals on Cat 5 cables.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a tablet computer, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a gaming system, etc.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
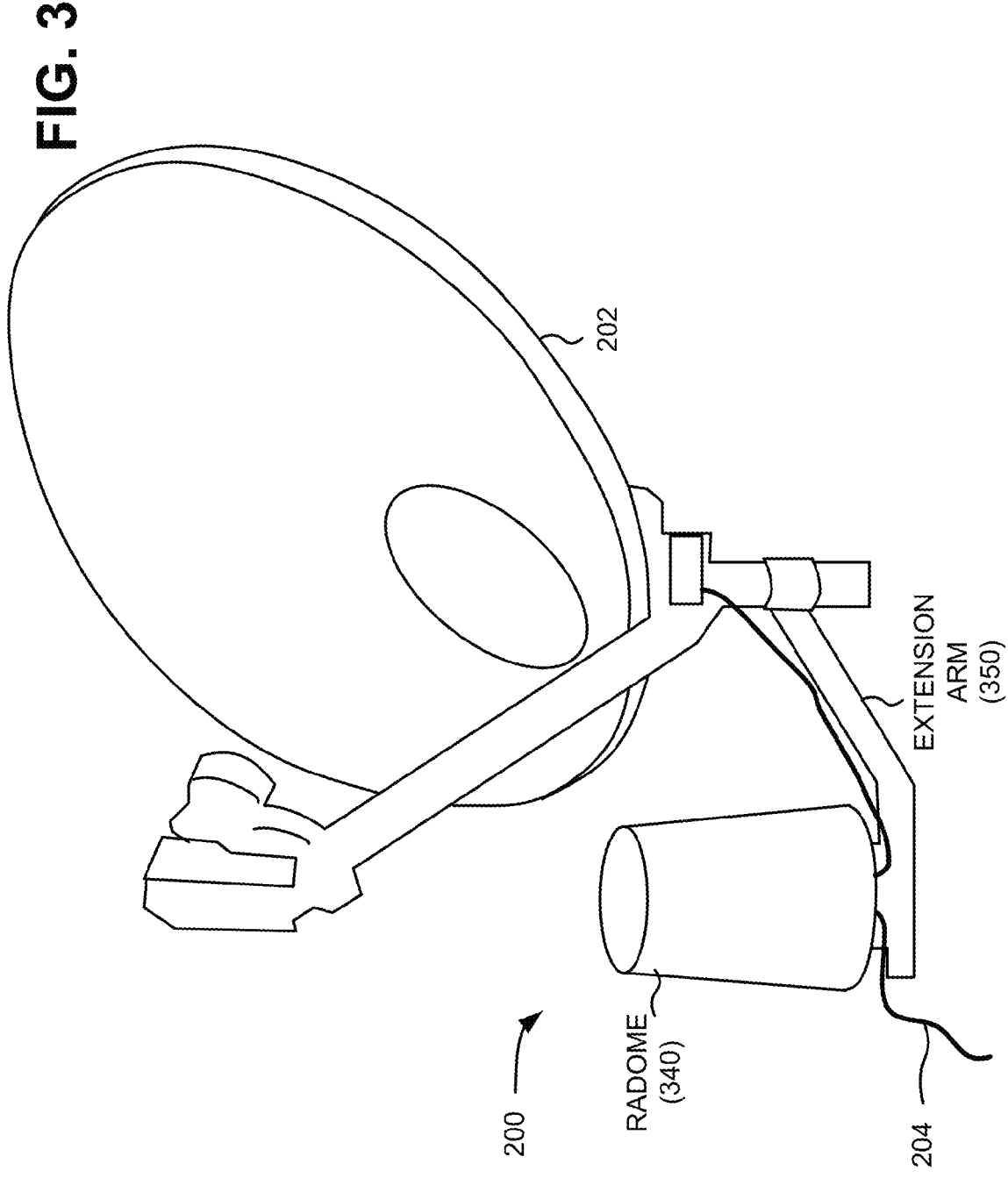
FIG. 3 is a diagram of example components of an outdoor portion of the customer premises network depicted in FIG. 2.

FIG. 3 is a diagram of example components of combined gateway equipment 115 of customer premises network 110. As illustrated, combined gateway equipment 115 may include outdoor broadband unit 200 and satellite antenna 202. Outdoor broadband unit 200 may include a radome 340 to house various components used to enable a LTE broadband connection through base station 120. Satellite antenna 202 may include features described above in connection with, for example, FIGS. 1 and 2. Outdoor broadband unit 200 may be mounted on an extension arm 350 connected to a pole supporting satellite antenna 202.

Radome 340 may provide a weatherproof enclosure to protect the components, installed within radome 340, that enable network connectivity to customer premises network 110. Generally, radome 340 may include any RF transparent structure that protects components in the outdoor environment.

Combined gateway equipment 115 may be integrated with the SWiM environment associated with satellite antenna 202 to provide both TV services and broadband wireless services. With this architecture, combined gateway equipment 115 may require only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2). Coax cable 204 may also provide power to outdoor broadband unit 200.

Although FIG. 3 shows example components of combined gateway equipment 115, in other implementations, combined gateway equipment 115 may contain fewer components, different components, differently arranged components, and/or additional components than depicted in FIG. 3. Alternatively, or additionally, one or more components of combined gateway equipment 115 may perform one or more other tasks described as being performed by one or more other components of combined gateway equipment 115.

Figure 4:
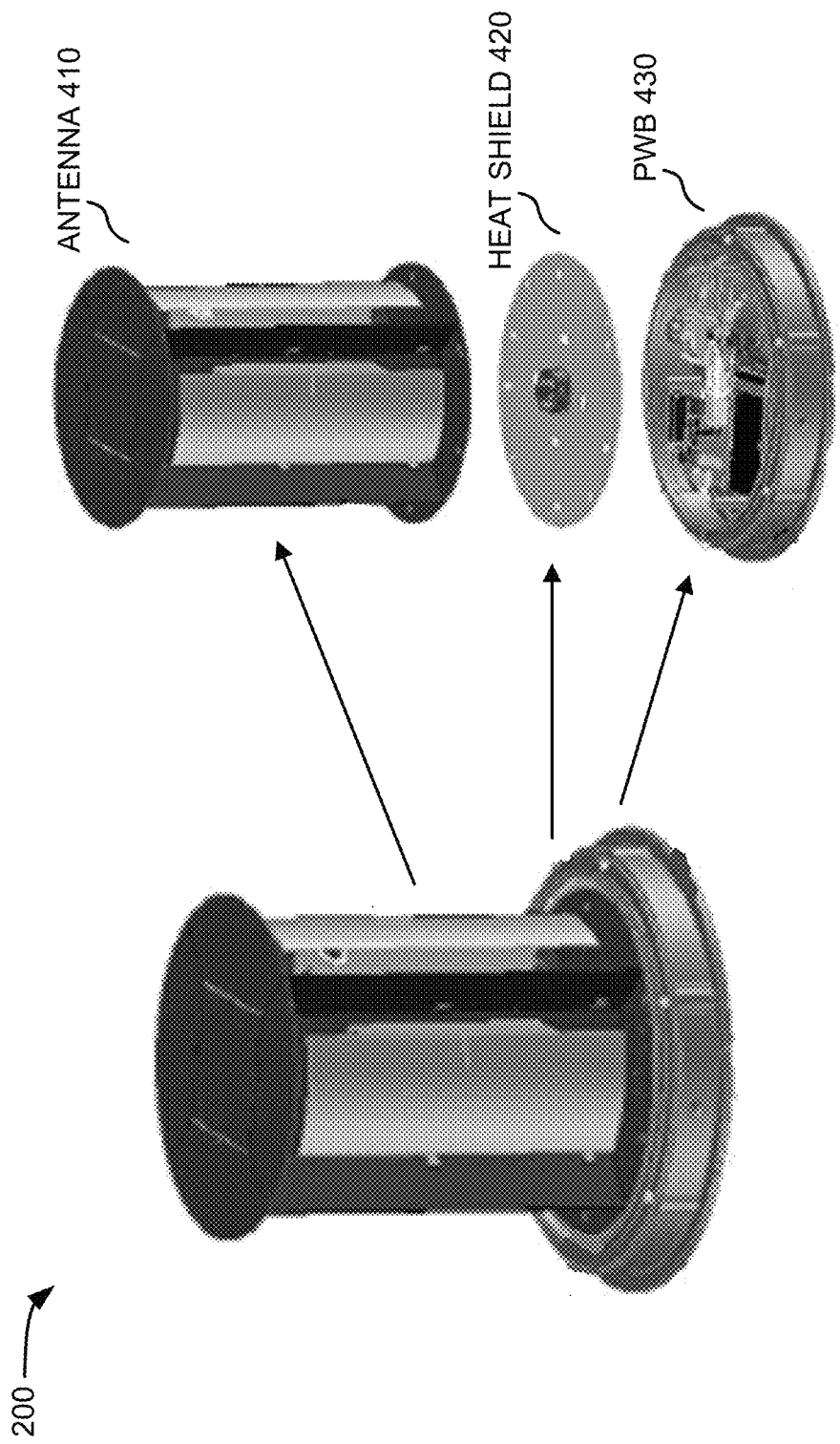
FIG. 4 is a perspective diagram illustrating an example implementation of an outdoor broadband unit.

FIG. 4 is a perspective diagram illustrating an example implementation of outdoor broadband unit 200. In FIG. 4, radome 340 is removed from outdoor broadband unit 200 to illustrate the inside of outdoor broadband unit 200. Outdoor broadband unit 200 may include an antenna 410, a heat shield 420, and a printed wiring board (PWB) 430. PWB 430 may be installed in an enclosure at the bottom of outdoor broadband unit 200. Heat shield 420 may be installed on top of PWB 430, and may provide a heat barrier between antenna 410 and PWB 430. Antenna 410 may be installed on top of heat shield 420 and may be electrically connected to PWB 430.

Antenna 410 may include an antenna to transmit and/or receive RF signals over the air. Antenna 410 may, for example, receive RF signals from PWB 430 and transmit the RF signals over the air. Also, antenna 410 may, for example, receive RF signals over the air and provide them to PWB 430. In one implementation, the components in PWB 430 may communicate, using antenna 410, with a base station (e.g., base station 120) connected to a network (e.g., network 130) to send and/or receive signals from user devices 270.

In one implementation, antenna 410 may include a wideband multiple beam antenna, with partially overlapping antenna beams, spanning 360 degrees in azimuth (x-y plane). For example, antenna 410 may include between four and eight beams (e.g., to achieve desirable antenna gains and reduction of interference). Additionally, or alternatively, antenna 410 may employ two polarizations per beam for 2×2 downlink multiple-input and multiple-output (MIMO) operation.

In another implementation, antenna 410 may include a fixed dually-polarized directional antenna. As a directional antenna, antenna 410 may use polarizations matched to the polarizations of a particular base station (e.g., base station 120). For example, polarization of antenna 410 may be matched in polarization with a serving enhanced Node B (eNB) or base station (e.g., base station 120). Antenna pointing for the directional antenna may be conducted, for example, during installation of outdoor broadband unit 200.

Heat shield 420 may define a barrier between antenna 410 and PWB 430. Heat shield 420 may include, for example, a heat insulating material. In some implementations, heat shield 420 may also act as a RF shield to shield stray RF signals, produced by components on PWB 430, from antenna 410.

PWB 430 may include a substrate that mechanically holds and connects various electronic components that are installed onto PWB 430. PWB 430 may include, for example, a laminate structure that routes signals between electronic components that are mounted on PWB 430. Although described as a printed wiring board, PWB 430 may be referred to as a printed circuit board (PCB), etched wiring board, or printed circuit assembly (PCA).

Although FIG. 4 shows example components of outdoor broadband unit 200, in other implementations, outdoor broadband unit 200 may contain fewer components, different components, differently arranged components, and/or additional components than depicted in FIG. 4. Alternatively, or additionally, one or more components of outdoor broadband unit 200 may perform one or more other tasks described as being performed by one or more other components of outdoor broadband unit 200.

Figure 5:
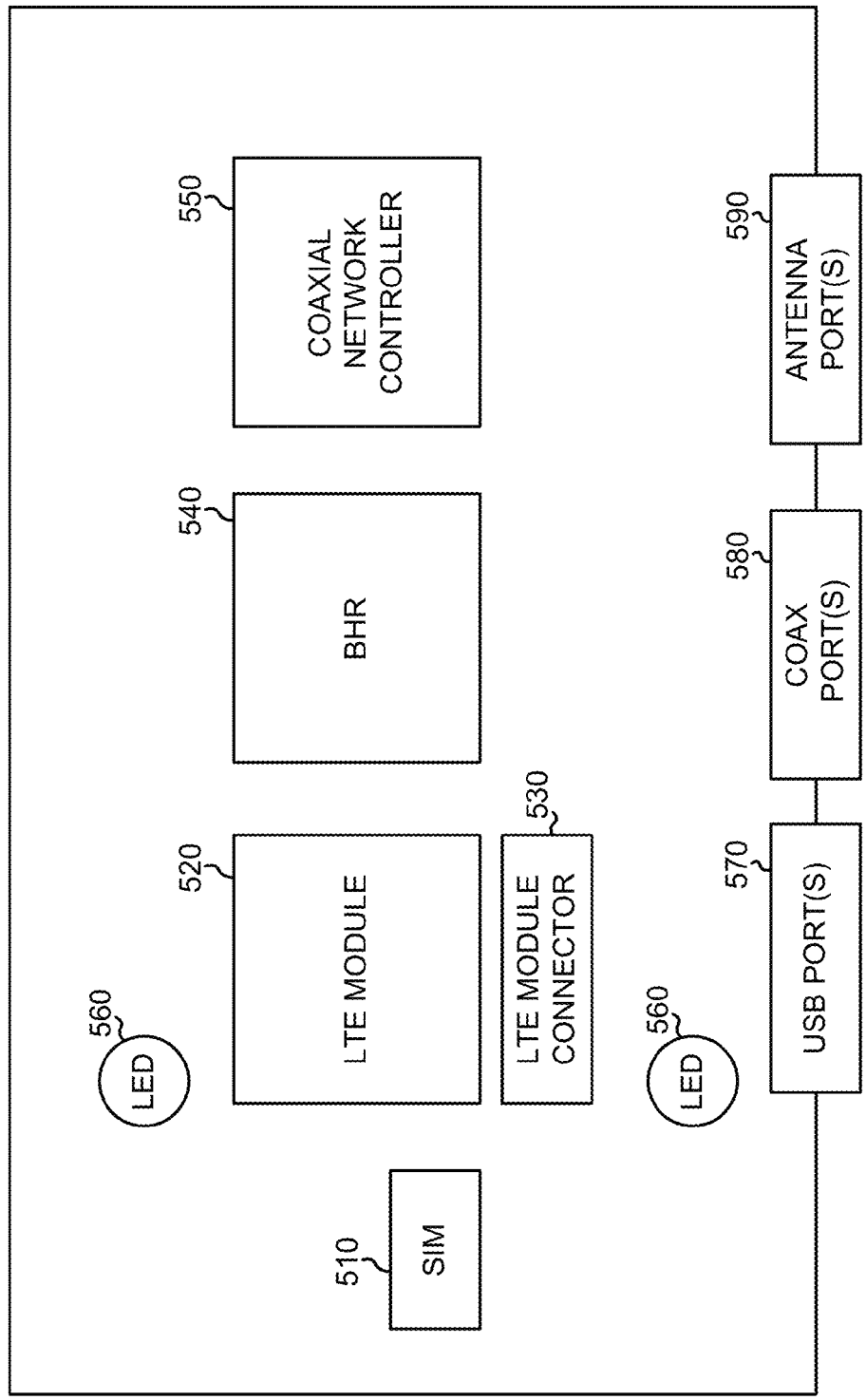
FIG. 5 is a diagram illustrating an example of components that may be installed on a printed wiring board in the outdoor broadband unit.

FIG. 5 is a diagram illustrating an example of components that may be installed on PWB 430. PWB 430 may include a SIM module 510, a LTE module 520, a LTE module connector 530, a broadband home router (BHR) 540, a coaxial network controller 550, and light emitting diodes (LEDs) 560. PWB 430 may also include a number of connectors to connect to external devices or systems, such as customer premises network 110, antenna 410, and satellite antenna 202. The connectors shown in FIG. 5 may include universal serial bus (USB) port(s) 570, coaxial port(s) 580, and antenna port(s) 590. The components shown in FIG. 5 may be implemented as integrated circuits or other electronic components and illustrate various functionality that may be included on PWB 430. For simplicity, conductive traces connecting the components shown in FIG. 5 are not illustrated.

SIM module 510 may include a SIM card or integrated circuit (chip). In general, SIM module 510 may function to identify and provide services, such as security services, to the subscriber, associated with the customer premises, when connecting to the LTE network through base station 120. SIM module 510 may contain, for example, a unique serial number (ICCID), an internationally unique number associated with customer premises network 110, security authentication and ciphering information, and/or a list of the services to which customer premises network 110 has access.

In one implementation, SIM module 510 may be fixedly attached to PWB 430. For instance, SIM module 510 may be soldered onto PWB 430. By fixedly attaching SIM module 510 to PWB 430, in contrast to inserting SIM module 510 into a SIM slot typically used for mobile phones, SIM module 510 can be securely and permanently associated with PWB 430. Because outdoor broadband unit 200 may have a relatively long expected service life (e.g., 10 years) and may operate in relatively harsh outdoor climate conditions (e.g., high wind, extreme temperatures), fixedly attaching SIM module 510 to PWB 430 can improve the durability of outdoor broadband unit 200.

SIM module 510, in addition to being fixedly attached to PWB 430, may have a higher rated temperature range than SIM cards typically used in consumer mobile phones. For example, SIM module 510 may be a military grade (e.g., rated to operate between −55 to 125 degrees Celsius) or an industrial grade (e.g., rated to operate between −40 to 85 degrees Celsius) integrated circuit. Higher grade integrated circuits may generally be characterized by different manufacturing materials/techniques or more rigorous testing.

LTE module 520 may include hardware or a combination of hardware and software having communication capability via an air interface. In other words, LTE module 520 may be a control module for the LTE air interface. For example, LTE module 320 may receive broadband signals and/or voice over IP (VoIP) signals from base station 120 (e.g., via antenna 410) and transmit broadband signals and/or VoIP signals to base station 120 (e.g., via antenna 410). LTE module 520 may employ frequency division duplex (FDD) and/or time division duplex (TDD) techniques to facilitate downlink and uplink transmissions. In one implementation, LTE module 520 may include a beam selection mechanism that selects the best antenna beam, from RF antenna 410, according to a certain optimization criteria. Beam selection may be performed, for example, during initial installation and/or regular maintenance of outdoor broadband unit 200. Additionally, or alternatively, LTE module 520 may select any of the antenna beams, based on real-time measurements, during normal operation. LTE module 520 may connect to antenna 410 through antenna port(s) 590.

In one implementation, LTE module 520 may be manufactured as an insertable card, such as a mini-PCI (peripheral component interconnect) card that may be inserted into PWB 430. LTE module connector 530 may include a slot, such as a PCI slot, into which LTE module 520 may be inserted and connected to PWB 430.

BHR 540 may include logic for providing packet routing and/or switching services for data received over or transmitted to the LTE network via LTE module 520. BHR 540 may, for instance, receive data packets from base station 120 (e.g., via LTE module 520) and forward the data packets toward user devices 270. In addition, BHR 540 may receive data packets from user devices 270 (e.g., via local router 260) and forward the data packets toward recipient devices (e.g., service provider 140) via network 130.

Coaxial network controller 550 may provide an interface for Ethernet over coaxial signals, such as signals transmitted over coaxial cable 204 and into customer premises network 110. Coaxial network controller 540 may act as a bridge device to receive signals from LTE module 520 and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller 540 may be inserted in a Mid-RF MoCA channel that is separate from the 950 MHz to 2150 MHz range of a typical satellite TV system.

LEDs 560 may emit light to provide status and diagnostic information relating to outdoor broadband unit 200. LEDs 560 may, for example, include an LED that is illuminated when power is being received, over coaxial cable 204, from customer premises network 110 (e.g., from power injector 220). In one implementation, one or more of LEDs 560 may be installed so that the light emitting portion of the LED is positioned externally to outdoor broadband unit 200. In this manner, a technician installing outdoor broadband unit 200 may be able to easily view the status of the LED.

PWB 430 may additionally include a number of output ports or physical interfaces. USB port(s) 570 may include ports for connecting to external devices through the USB serial communication standard. USB port(s) 570 may, for example, be used for diagnostic purposes, such as a port through which a technician can connect to PWB 410. Alternatively or additionally, USB port(s) 570 may be used to cross-connect various components of PWB 430. For example, BHR 540 and LTE module 520 may connect to one another through a USB interface. Coaxial port(s) 580 may include an interface for coaxial cables. As previously described, in one implementation, outdoor broadband unit 200 may be connected to a coaxial cable leading to satellite antenna 202 and a coaxial cable, coaxial cable 204, leading to customer premises network 110. Coaxial network controller 550 may provide a logical interface for coaxial port(s) 580. Antenna port(s) 590 may provide a physical connection to one or more antennas, such as antenna 410. In one implementation, antenna port(s) 590 may include a first connection to an RX (receive) antenna and a second connection to an RX/TX (receive/transmit) antenna.

Although FIG. 5 shows example components of PWB 430, in other implementations, PWB 430 may contain fewer components, different components, differently arranged components, and/or additional components than depicted in FIG. 5. Alternatively, or additionally, one or more components of PWB 430 may perform one or more other tasks described as being performed by one or more other components of PWB 430.

Figure 6:
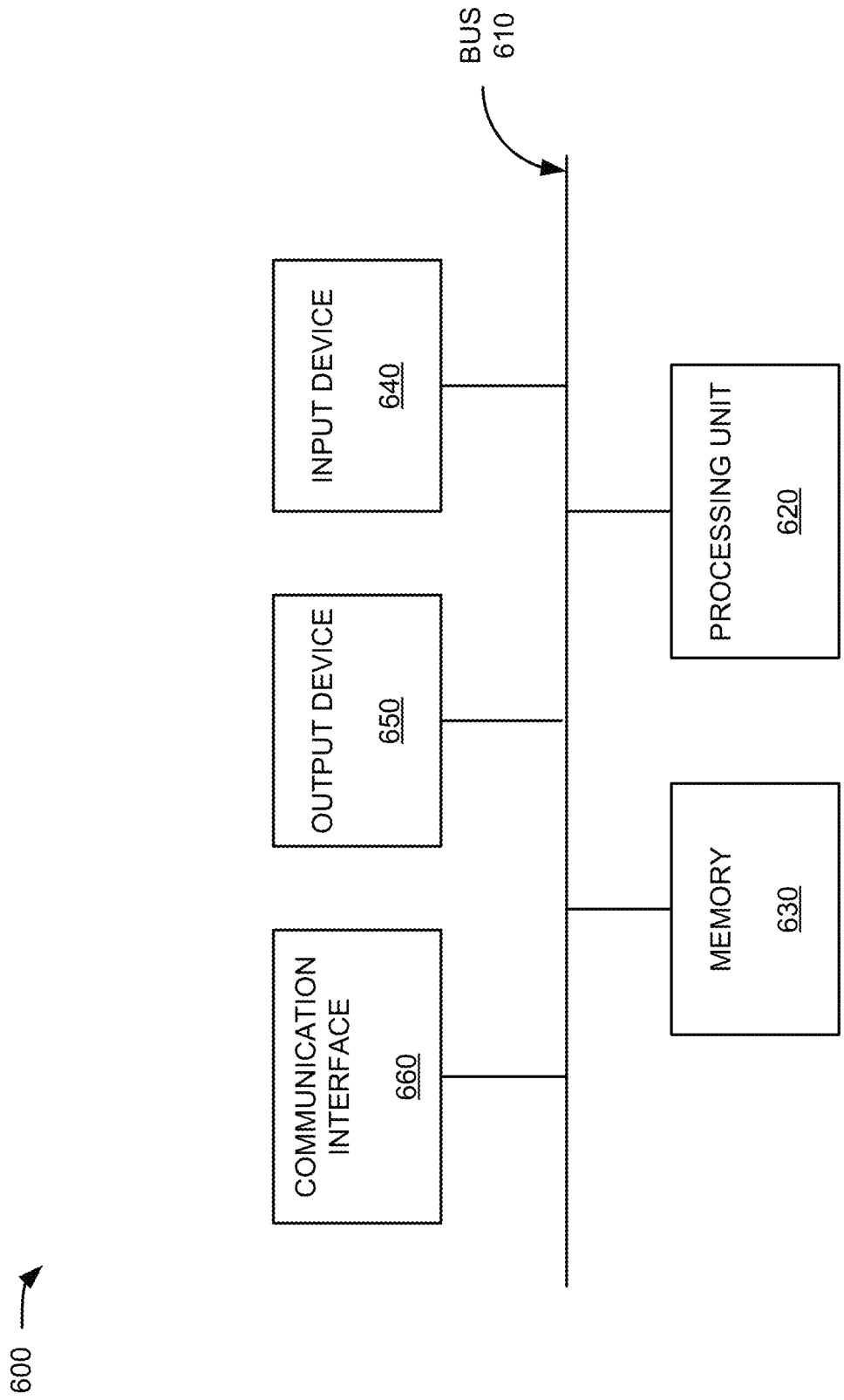
FIG. 6 is a diagram of example components of one or more of the devices depicted in FIGS. 1 and 2.

FIG. 6 is a diagram of example components of a device 600 that may correspond to one of the devices of environment 100 and/or customer premises network 110 (e.g., SIM module 510, LTE module 520, BHR 540, coaxial network controller 550, local router 260, etc.). As illustrated, device 600 may include a bus 610, a processing unit 620, a memory 630, an input device 640, an output device 650, and a communication interface 660.

Bus 610 may permit communication among the components of device 600. Processing unit 620 may include one or more processors or microprocessors that interpret and execute instructions. In other implementations, processing unit 620 may be implemented as or include one or more application specific integrated circuits (ASICs), field programmable gate arrays (FPGAs), or the like.

Memory 630 may include a random access memory (RAM) or another type of dynamic storage device that stores information and instructions for execution by processing unit 620, a read only memory (ROM) or another type of static storage device that stores static information and instructions for the processing unit 620, and/or some other type of magnetic or optical recording medium and its corresponding drive for storing information and/or instructions.

Input device 640 may include a device that permits an operator to input information to device 600, such as a keyboard, a keypad, a mouse, a pen, a microphone, one or more biometric mechanisms, and the like. Output device 650 may include a device that outputs information to the operator, such as a display, a speaker, etc.

Communication interface 660 may include any transceiver-like mechanism that enables device 600 to communicate with other devices and/or systems. For example, communication interface 660 may include mechanisms for communicating with other devices, such as other devices of environment 100 and/or customer premises network 110.

As described herein, device 600 may perform certain operations in response to processing unit 620 executing software instructions contained in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device via communication interface 660. The software instructions contained in memory 630 may cause processing unit 620 to perform processes described herein. Alternatively, hardwired circuitry may be used in place of or in combination with software instructions to implement processes described herein. Thus, implementations described herein are not limited to any specific combination of hardware circuitry and software.

Although FIG. 6 shows example components of device 600, in other implementations, device 600 may contain fewer components, different components, differently arranged components, or additional components than depicted in FIG. 6. Alternatively, or additionally, one or more components of device 600 may perform one or more other tasks described as being performed by one or more other components of device 600.

Figure 7:
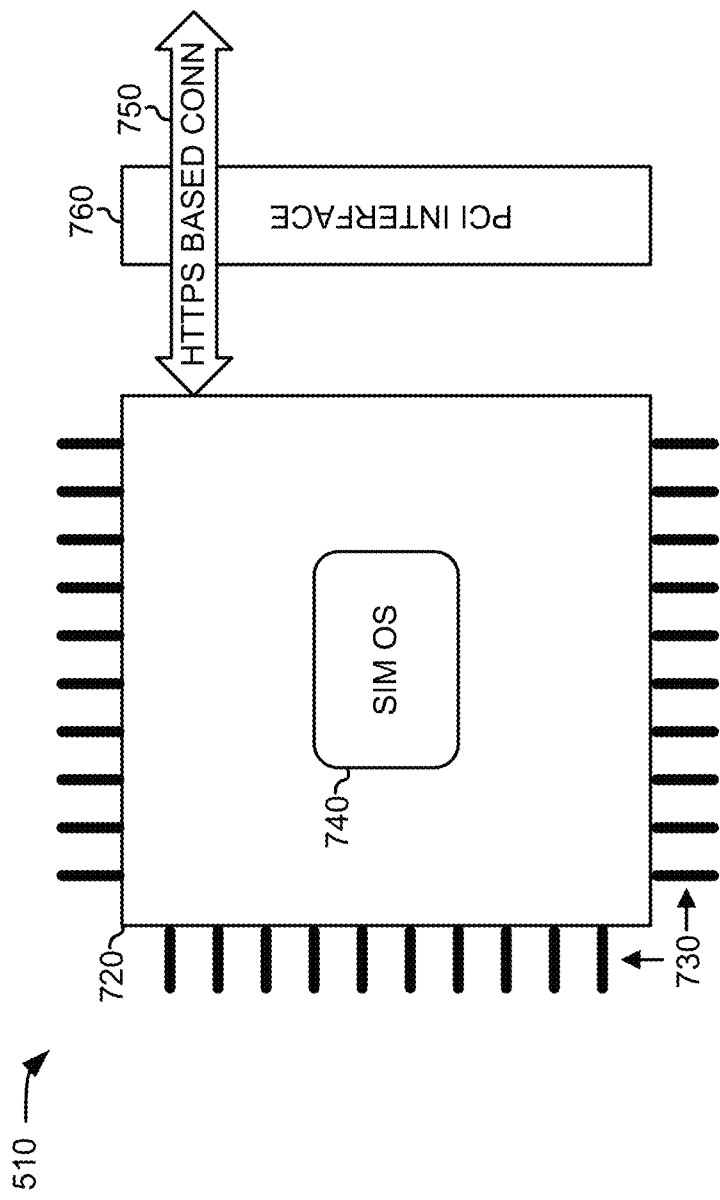
FIG. 7 is a diagram illustrating conceptual aspects relating to a subscriber identity module.

FIG. 7 is a diagram illustrating conceptual aspects relating to SIM module 510. SIM module 510 may be implemented as an integrated circuit chip 720 that is securely attached to PWB 430. Thus, SIM module 510 may be separately mounted from LTE module 520. For example, SIM module 510 may be soldered via surface mount soldering to PWB 430 (as illustrated by surface mount connections 730). Other techniques for attaching SIM module 510 to PWB 430 may alternatively be used.

In one implementation, and as discussed previously, integrated circuit chip 720 may be a military grade (e.g., rated to operate between −55 to 125 degrees Celsius) or an industrial grade (e.g., rated to operate between −40 to 85 degrees Celsius) integrated circuit. Increasing the rated operating temperature range of integrated circuit chip 720 may be beneficial in the relatively harsh outdoor environment that may be experienced by outdoor broadband unit 200.

SIM module 510 may include an operating system, shown as SIM OS 740. SIM OS 740 may provide network access, authentication, and billing services for customer premises network 110. SIM OS 740 may additionally provide the ability for service provider 140 to remotely manage SIM module 510 using over-the-air (OTA) technologies. For example, service provider 140 may be able to update SIM module 510 dynamically, providing new applications and services without requiring a user of customer premises network 110 to manually upgrade.

In one implementation, SIM OS 740 may provide authentication services for SIM module 510. The authentication services may include authentication with service provider 140 based on an IP multimedia services identity module (ISIM) application or an universal subscriber identity module (USIM) application. Both the ISIM or USIM authentication applications may be implemented over a hypertext transfer protocol secure (HTTPS) connection 750 (HTTPS BASED CONN).

In one implementation, integrated circuit chip 720 may communicate with other devices on PWB 430, such as LTE module 520, via PCI interface 760. In alternative implementations, other interface standards could be used.

The foregoing description of implementations provides illustration and description, but is not intended to be exhaustive or to limit the invention to the precise form disclosed. Modifications and variations are possible in light of the above teachings or may be acquired from practice of the invention.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
an outdoor broadband unit connected to an external portion of a customer premises, the outdoor broadband unit including:
  a radio frequency (RF) antenna to receive communications from a Long-Term Evolution (LTE) network,
  a printed wiring board including:
    an integrated circuit (IC) chip to implement a subscriber identity module (SIM) to provide services for the LTE network,
      the IC chip being soldered to the printed wiring board and having a rated temperature range corresponding to an industrial grade or military grade integrated circuit, and
      the IC chip providing authentication services for the SIM using a hypertext transfer protocol secure (HTTPS) connection, and
  a control module to implement an air interface for the LTE network, and
  a radome to contain the RF antenna and the printed wiring board;
a satellite antenna to receive communications from a satellite network; and
a support arm to hold the outdoor broadband unit and the satellite antenna.

2. The system of claim 1, where the IC chip is coupled to the control module via a peripheral component interconnect (PCI) interface.

3. The system of claim 1, where the outdoor broadband unit further includes:
  a heat shield located between the RF antenna and the printed wiring board.

4. The system of claim 1, where the IC chip is soldered to the printed wiring board using surface mount technology.

5. The system of claim 1,
where the control module includes an insertable card, and
where the printed wiring board further includes:
  a peripheral component interconnect (PCI) connection slot to hold the insertable card.

6. The system of claim 1, where the authentication provided by the IC chip includes an authentication using an Internet protocol (IP) multimedia services identity module (ISIM) application or an universal subscriber identity module (USIM) application.

7. The system of claim 1, where the printed wiring board further includes:
  a coaxial network controller to provide an interface for Ethernet over coaxial signals.

8. The system of claim 1, where the rated temperature range of the IC chip is at least between −40 and 85 degrees Celsius.

9. A system comprising:
an outdoor broadband unit to connect to an external portion of a customer premises, the outdoor broadband unit including:
  a radio frequency (RF) antenna to receive communications from a Long-Term Evolution (LTE) network,
  a subscriber identity module (SIM) chip to provide services for the LTE network,
    the SIM chip having a rated temperature range of at least between −40 and 85 degrees Celsius, and
    the SIM chip providing authentication services for the LTE network using a hypertext transfer protocol secure (HTTPS) connection,
  a control module to implement an air interface for the LTE network,
  a coaxial network controller to provide an interface for Ethernet over coaxial signals that are exchanged with the customer premises, and
  a radome to contain the RF antenna, the SIM chip, the control module, and the coaxial network controller;
a satellite antenna to receive communications from a satellite network; and
a support arm to hold the outdoor broadband unit and the satellite antenna.

10. The system of claim 9, where the SIM chip is coupled to the control module via a peripheral component interconnect (PCI) interface.

11. The system of claim 9, where the SIM chip, the control module, and the coaxial network controller are disposed on a printed wiring board.

12. The system of claim 11, where the SIM chip is soldered to the printed wiring board using surface mount technology.

13. The system of claim 9, where the outdoor broadband unit further includes:
  a heat shield located within the radome and between the RF antenna and the SIM chip, the control module, and the coaxial network controller.

14. The system of claim 9, where the authentication provided by the SIM chip includes authentication using an Internet protocol (IP) multimedia services identity module (ISIM) application or an universal subscriber identity module (USIM) application.

15. A system comprising:
an outdoor unit including:
  a radio frequency (RF) antenna to receive communications from a Long-Term Evolution (LTE) network,
  a chip to implement a subscriber identity module (SIM) to provide services for the LTE network,
  a module to implement an air interface for the LTE network, and
  a radome to contain the RF antenna, the chip, and the module;
a satellite antenna to receive communications from a satellite network,
  the satellite antenna being connected to the outdoor unit; and
an extension arm to hold the outdoor unit and the satellite antenna.

16. The system of claim 15, where the outdoor unit is mounted on a roof of a customer premises.

17. The system of claim 15, where the chip is permanently fixed to the outdoor unit.

18. The system of claim 15, where the chip is hardened to withstand a rated temperature range of at least between −40 degrees Celsius and 85 degrees Celsius.

19. The system of claim 15, where the chip provides authentication services for the LTE network using a hypertext transfer protocol secure (HTTPS) connection.

20. The system of claim 15, where the outdoor unit further includes:
  a heat shield located within the radome and between the RF antenna and the chip.

21. The system of claim 15, further comprising:
 a coaxial network controller to provide an interface for Ethernet over coaxial signals that are exchanged with a customer premises that is connected to the system.

22. The system of claim 15, where the chip is soldered to a printed wiring board of the outdoor unit.

* * * * *